US010093025B2

(12) United States Patent
Kiyama et al.

(10) Patent No.: US 10,093,025 B2
(45) Date of Patent: Oct. 9, 2018

(54) PART CONVEYOR SYSTEM AND ATTITUDE ADJUSTING JIG

(71) Applicant: FANUC CORPORATION, Yamanashi (JP)

(72) Inventors: Yuichiro Kiyama, Yamanashi (JP); Masaru Oda, Yamanashi (JP); Toshimichi Yoshinaga, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 374 days.

(21) Appl. No.: 14/803,301

(22) Filed: Jul. 20, 2015

(65) Prior Publication Data

US 2016/0023850 A1    Jan. 28, 2016

(30) Foreign Application Priority Data

Jul. 24, 2014    (JP) .................................. 2014-151046

(51) Int. Cl.
*B25J 19/02*    (2006.01)
*B25J 15/06*    (2006.01)

(52) U.S. Cl.
CPC ......... *B25J 19/023* (2013.01); *B25J 15/0616* (2013.01); *Y10S 901/27* (2013.01)

(58) Field of Classification Search
CPC .... B23Q 3/104; B25B 11/002; B25J 15/0042; B25J 15/0608; B25J 19/023; B65G 47/14; B65G 47/1414; B65G 47/1421; B65G 47/24; H05K 13/022
USPC ........ 198/382, 389, 390, 391; 269/7, 8, 296, 269/302
See application file for complete search history.

(56) References Cited

U.S. PATENT DOCUMENTS 4,773,156 A * 9/1988 Kurita .................... B23P 19/06
                                                                    198/339.1
8,721,252 B2 * 5/2014 Osada .................. B23P 19/001
                                                                    414/267

FOREIGN PATENT DOCUMENTS

| JP | 60194430 U | 12/1985 |
| JP | 593727 U | 12/1993 |
| JP | 958846 A | 3/1997 |
| JP | 9124132 A | 5/1997 |
| JP | 2008155279 A | 7/2008 |
| JP | 200956579 A | 3/2009 |
| JP | 5429961 B2 | 2/2014 |

(Continued)

OTHER PUBLICATIONS

English Abstract for Japanese Publication No. 5429961 B2, published Feb. 26, 2014, 1 pg.

(Continued)

*Primary Examiner* — Saul Rodriguez
*Assistant Examiner* — Brendan P Tighe
(74) *Attorney, Agent, or Firm* — Fredrikson & Byron, P.A.

(57) ABSTRACT

The present invention provides a part conveyor system comprising an attitude adjusting jig which adjusts the attitude of a part which has an axis part and a head part, and a conveyor device which takes out and conveys the part from the attitude adjusting jig. The attitude adjusting jig is provided with a recessed part which has an inside space which is sandwiched between a pair of upward slanted surfaces facing each other, a groove part which is formed at the bottom of the recessed part for holding the axis part of the part, and a magnet which is arranged in the groove part.

9 Claims, 6 Drawing Sheets

(56) References Cited

FOREIGN PATENT DOCUMENTS

KR        20030073814 A    *   9/2003

OTHER PUBLICATIONS

English Abstract and Machine Translation for Japanese Publication No. 2008-155279 A, published Jul. 10, 2008, 12 pgs.
English Abstract and Machine Translation for Japanese Publication No. 2009-056579 A, published Mar. 19, 2009, 10 pgs.
English Abstract and Machine Translation for Japanese Publication No. 09-058846 A, published Mar. 4, 1997, 14 pgs.
English Abstract and Machine Translation for Japanese Publication No. 09-124132 A, published May 13, 1997, 9 pgs.
English Abstract and Machine Translation for Japanese Publication No. 05-093727 U, published Dec. 21, 1993, 6 pgs.
English Abstract and Machine Translation for Japanese Publication No. 60-194430 U, published Dec. 25, 1985, 4 pgs.

* cited by examiner

PART CONVEYOR SYSTEM AND ATTITUDE ADJUSTING JIG

BACKGROUND OF THE INVENTION

1. Field of the Invention

The present invention relates to a part conveyor system which adjusts the attitude of a part having an axis part and a head part while conveying it, and an attitude adjusting jig which adjusts the attitude of a part having an axis part and a head part.

2. Description of the Related Art

A part aligning device for aligning a part having a head part and axis part such as a bolt or screw to the same attitude, is known in the prior art. For example, JP-B-5429961 proposes a bolt aligning device which comprises a plurality of rollers which are arranged in parallel, a drive unit which rotates the plurality of rollers in the same direction, and a brush shaped rotary member which is arranged above the plurality of rollers. The bolt aligning device of JP-B-5429961 is provided with alignment clearances which are formed between adjoining rollers, and is designed to drop nonaligned bolts into the alignment clearances by rotary movement of the brush shaped rotary member. This ensures that the axis parts of the bolts are guided into the alignment clearances, and therefore the bolts are adjusted to the same attitudes so that the respective axis parts are directed downward. However, the bolt aligning device of JP-B-5429961 requires a drive means such as a motor for driving the above rollers and rotary member, and thus is disadvantageous in that the structure of the device as a whole is complicated and the manufacturing cost of the device as a whole is increased.

A part conveyor system which can adjust the attitudes of parts having axis parts and head parts while conveying them without using a drive means such a motor has been sought.

SUMMARY OF INVENTION

According to a first aspect of the present invention, there is provided a part conveyor system comprising an attitude adjusting jig which adjusts an attitude of a part having an axis part and a head part which overhangs outward from one end of the axis part, and a conveyor device which takes out and convey the part from the attitude adjusting jig, wherein the attitude adjusting jig comprising a recessed part which has an inside space which is sandwiched between a pair of upward slanted surfaces facing each other, a groove part which is formed at a bottom of the recessed part for holding the axis part, and a magnet which is arranged in the groove part.

According to a second aspect of the present invention, there is provided a part conveyor system of the first aspect, wherein the attitude adjusting jig further comprises a contact surface which extends between a bottom end of each of the pair upward slanted surfaces and a top end of each of a pair of inside surfaces of the groove part so as to contact an overhanging surface of the head part which overhangs outward from the axis part.

According to a third aspect of the present invention, there is provided a part conveyor system of the first or second aspect, wherein the conveyor device is a robot.

According to a fourth aspect of the present invention, there is provided a part conveyor system of any one of the first to third aspects, further comprising a detection device which detects a position of the part in the attitude adjusting jig.

According to a fifth aspect of the present invention, there is provided a part conveyor system of the fourth aspect, wherein the detection device has a displacement meter or visual sensor.

According to a sixth aspect of the present invention, there is provided a part conveyor system of any one of the first to fifth aspects, wherein the part is a bolt.

According to a seventh aspect of the present invention, there is provided an attitude adjusting jig which adjusts an attitude of a part having an axis part and a head part which overhangs outward from one end of the axis part, comprising a recessed part which has an inside space which is sandwiched between a pair of upward slanted surfaces facing each other, a groove part which is formed at a bottom of the recessed part and for holding the axis part, and a magnet which is arranged in the groove part.

According to an eighth aspect of the present invention, there is provided an attitude adjusting jig of the seventh aspect, further comprising a contact surface (16) which extends between a bottom end of each of the upward slanted surfaces and a top end of each of a pair of inside surfaces of the groove part so as to contact an overhanging surface of the head part which overhangs outward from the axis part.

According to a ninth aspect of the present invention, there is provided an attitude adjusting jig of the seventh or eighth aspect, wherein the part is a bolt.

These and other objects, features, and advantages of the present invention will become clearer with reference to the detailed description of an illustrative embodiment of the present invention which is shown in the attached drawings.

DETAILED DESCRIPTION OF EMBODIMENTS

Figure 1:
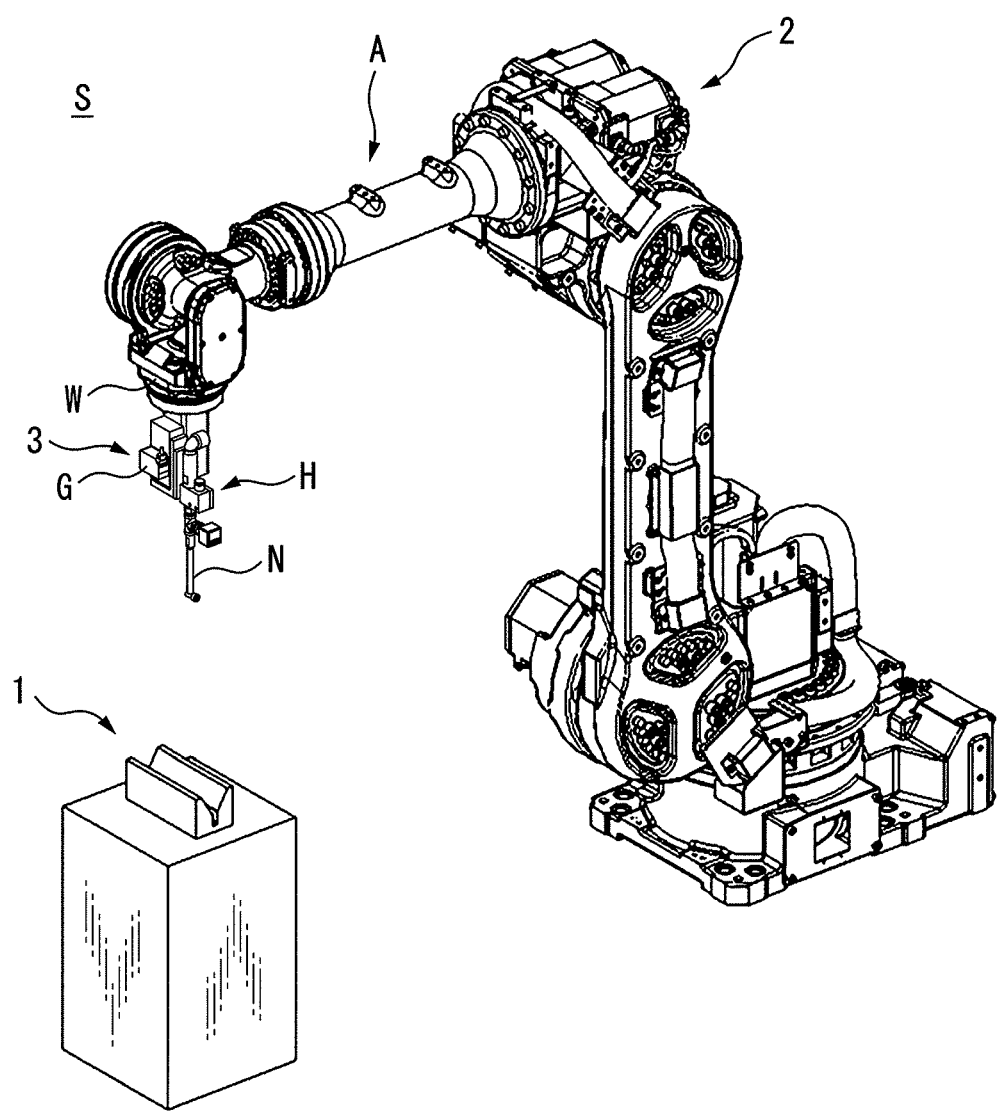
FIG. 1 is a perspective view of an illustrative part conveyor system according to an embodiment of the present invention.

Below, an embodiment of the present invention will be explained in detail with reference to the drawings. In the drawings, similar component elements are assigned similar reference notations. Note that the following explanation does not limit the technical scope of the inventions which are described in the claims or the meaning of terms etc.

Referring to FIG. 1 to FIG. 10, a part conveyor system of one embodiment of the present invention will be explained. The part conveyor system of the present embodiment is an automation system which conveys a part such as a bolt which has an axis part and a head part by operating a conveyor device. The process by which the part conveyor system of the present embodiment conveys a part will sometimes be referred to as a "conveyance process". FIG. 1 is a perspective view of an illustrative part conveyor system S of the present embodiment. As shown in FIG. 1, the part conveyor system S of the present example includes an attitude adjusting jig 1 which is used for adjusting the attitude of a part P during the conveyance process, and a conveyor device 2 which takes out and conveys a part which is placed on the attitude adjusting jig 1.

The conveyor device 2 of the present example is a robot which can perform both of a process of gripping one by one a part placed on a predetermined start area and loading it into the attitude adjusting jig 1, and a process of taking out one by one a part from the attitude adjusting jig 1 and unloading it into a predetermined destination area. Below, the former process will sometimes be referred to as a "loading process", while the latter process will sometimes be referred to as a "takeout process". The part conveyor system S of the present embodiment may also comprise a single robot which can perform the loading process and another robot which can perform the takeout process. The above start area is for example the inside space of a container in which innumerable parts are piled in bulk, and the above destination area is for example the next process area in which the individual parts are assembled into semifinished parts. The layouts of the start area and destination area can be freely changed within the work space of the conveyor device 2. The specific structure of the conveyor device 2 of the present example will be explained later.

Figure 2:
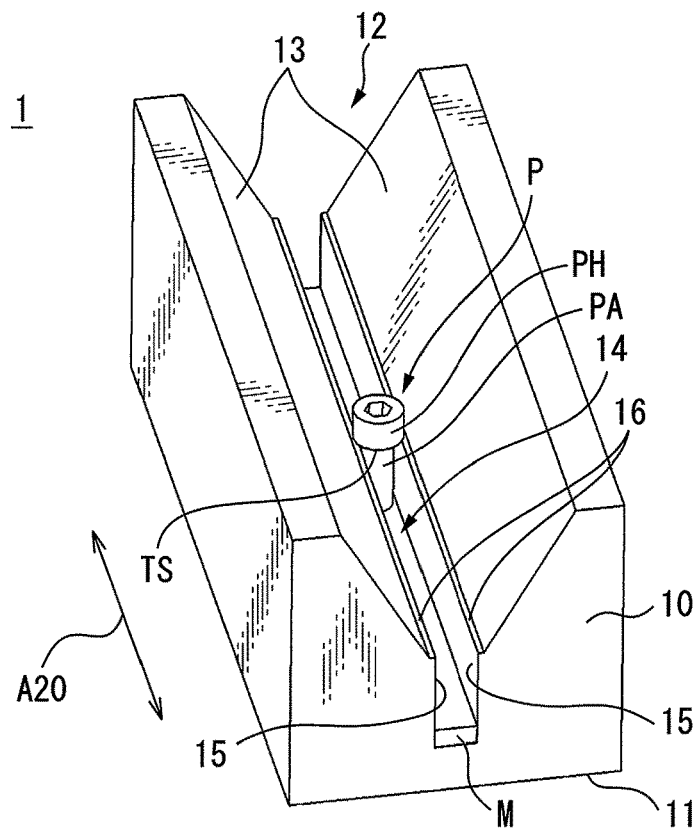
FIG. 2 is a perspective view which shows an illustrative attitude adjusting jig in the part conveyor system of the present embodiment, together with a part.
Figure 3:
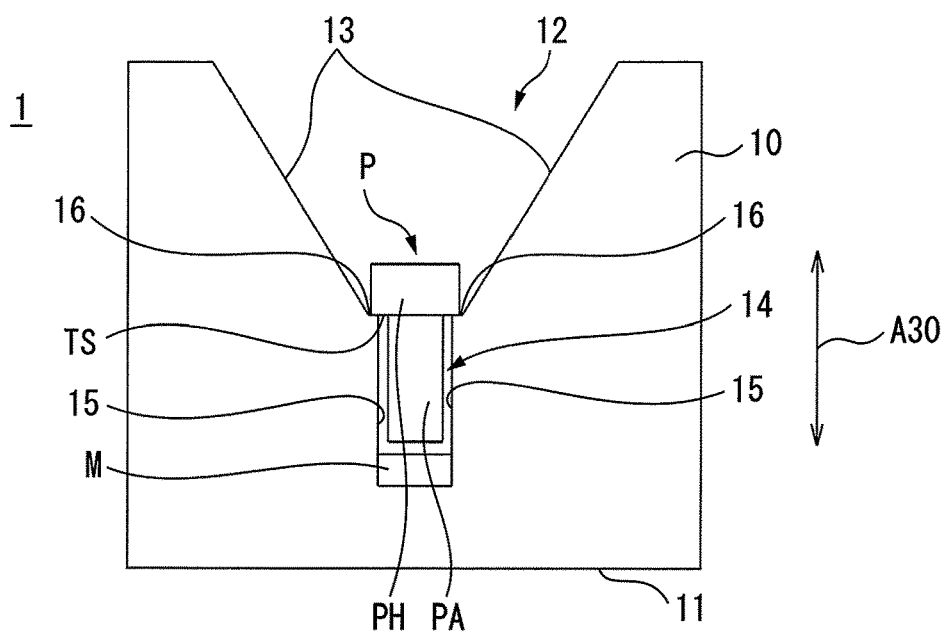
FIG. 3 is a front view which shows an attitude adjusting jig of FIG. 2, together with a part.

FIG. 2 is a perspective view which shows an illustrative attitude adjusting jig 1 in the part conveyor system S of the present embodiment together with a part P, and FIG. 3 is a front view which shows an attitude adjusting jig 1 of FIG. 2 together with a part P. As shown in FIG. 2 and FIG. 3, the part P to be conveyed by the part conveyor system S of the present embodiment has a columnar axis part PA and a head part PH which overhangs outward from a base end of the axis part PA. I.e., the head part PH of part P has a lower surface TS which overhangs outward from a base end of the axis part PA. The part P of the present invention is typically a bolt, screw, etc. which is formed from various electromagnetic materials. As shown in FIG. 2, the attitude adjusting jig 1 of the present example has a main body 10 which has a predetermined cross-sectional shape and extends in the direction of the arrow A20 in the figure, and a magnet M which is attached to a predetermined location of the main body 10. The main body 10 can be formed from various nonmagnetic materials. The magnet M0 is typically a permanent magnet such as a ferrite magnet or neodymium magnet. The shape of the main body 10 of the attitude adjusting jig 1 will be explained below in detail.

As shown in FIG. 2 and FIG. 3, the main body 10 of the present example has a bottom surface 11 which can abut against a horizontal surface and a recessed part 12 which is recessed toward the bottom surface 11. The direction vertical to the top surface 11 of the main body 10 will sometimes be referred to below as the "up-down direction" of the main body 10. As shown in FIG. 2, the recessed part 12 of the main body 10 has an inside space which is sandwiched between a pair of slanted surfaces 13, 13 facing each other. There is a groove part 14 with predetermined dimension at the bottom of the recessed part 12. The pair of slanted surfaces 13, 13 and groove part 14 all extend in the direction of the arrow A20 in FIG. 2. As shown in FIG. 3, the pair of slanted surfaces 13, 13 are slanted upward in the up-down direction of the main body 10 (direction of arrow A30 in the figure). For this reason, when a part P is loaded into the recessed part 12 from above, that part P slides along one of the slanted surfaces 13 and drops to the bottom of the recessed part 12.

Further, the groove part 14 formed at the bottom of the recessed part 12 has an inside space which is sandwiched between a pair of inside surfaces 15, 15 facing each other, and is dimensioned only to receive the axis part PA of the part P. More specifically, the pair of inside surfaces 15, 15 are generally parallel to the up-down direction, and the dimensions of the inside surfaces 15, 15 in the up-down direction (i.e., the depth of the groove part 14) are larger than the length of the axis part PA of the part P. Further, the distance between the inside surfaces 15, 15 (i.e., the width of the groove part 14) is larger than the diameter of the axis part PA of the part P and is smaller than the diameter of the head part PH. Therefore, when a part P drops to the bottom of the recessed part 12, the axis part PA of the part P can enter into the groove part 14, but the head part PH of that part P remains above the groove part 14 without entering into the groove part 14 (see FIG. 2 and FIG. 3). In this way, the attitude adjusting jig 1 of the present example can adjust the attitude of the part P which is loaded into the recessed part 12 from above so that the axis part PA is directed downward (i.e., the axis part PA is held inside the groove part 14 and the head part PH is exposed above the groove part 14).

Next, referring to FIG. 2 and FIG. 3, the above magnet M is located at the bottom of the groove part 14 of the main body 10. As shown in FIG. 2, the magnet M of this example has the form of a plate which extends in the direction of the arrow A20 over substantially the entire length of the groove part 14. Further, the magnet M of the present example is bonded to the bottom of the groove part 14 or is fitted between the inside surfaces 15, 15. However, the shape, dimensions, method of attachment, etc., of the magnet M are not limited to the above example. As shown in FIG. 3, the distance in the up-down direction from the top ends of the inside surfaces 15, 15 to the magnet M is somewhat larger than the length of the axis part PA of the part P. Therefore, when the part P drops to the bottom of the recessed part 12, the axis part PA of the part P may swing at the inside of the groove part 14 without interference with the magnet M. This point will be explained in detail with reference to FIG. 4 and FIG. 5.

Figure 4:
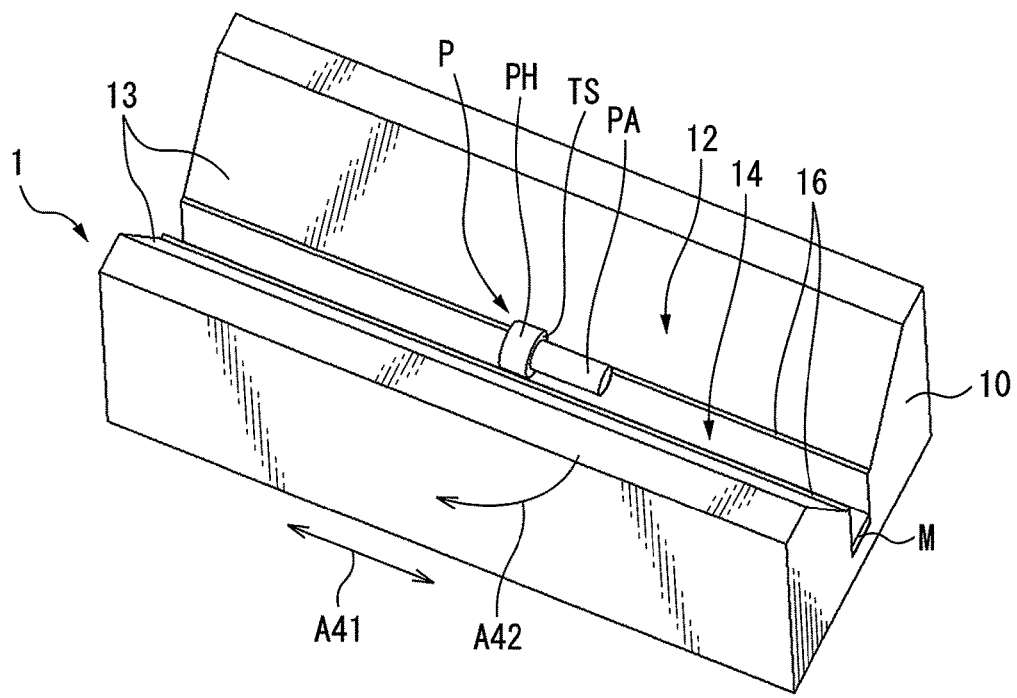
FIG. 4 is a first perspective view which shows an axis part of a part which swings inside of a groove part in the attitude adjusting jig of FIG. 2 and FIG. 3.

FIG. 4 is a first perspective view which shows the axis part PA of the part P which swings at the inside of the groove part 14 of the attitude adjusting jig 1 of FIG. 2 and FIG. 3. FIG. 4 shows the state right after the part P slid along the slanted surfaces 13 and dropped to the bottom of the recessed part 12. At the point of time of FIG. 4, the outer circumferential surface of the head part PH is in contact with the later explained contact surfaces 16, 16, and the axis part PA is generally parallel with the extension direction of the groove part 14 (i.e., direction of arrow A41 in figure). However, the axis part PA immediately enters into the groove part 14 and engages in swinging motion under the influence of the gravity which acts on the axis part PA and the attraction force of the magnet M. The direction of the swinging motion of the axis part PA at this time is shown by the arrow mark A42 in the figure. After that, although the axis part PA continues the swinging motion at the inside of the groove part 14, the swinging motion of the axis part attenuates and stops in a relatively short time under the influence of the attraction force of the magnet M which acts on the front end part of the axis part PA. This point will be explained below in detail.

Figure 5:
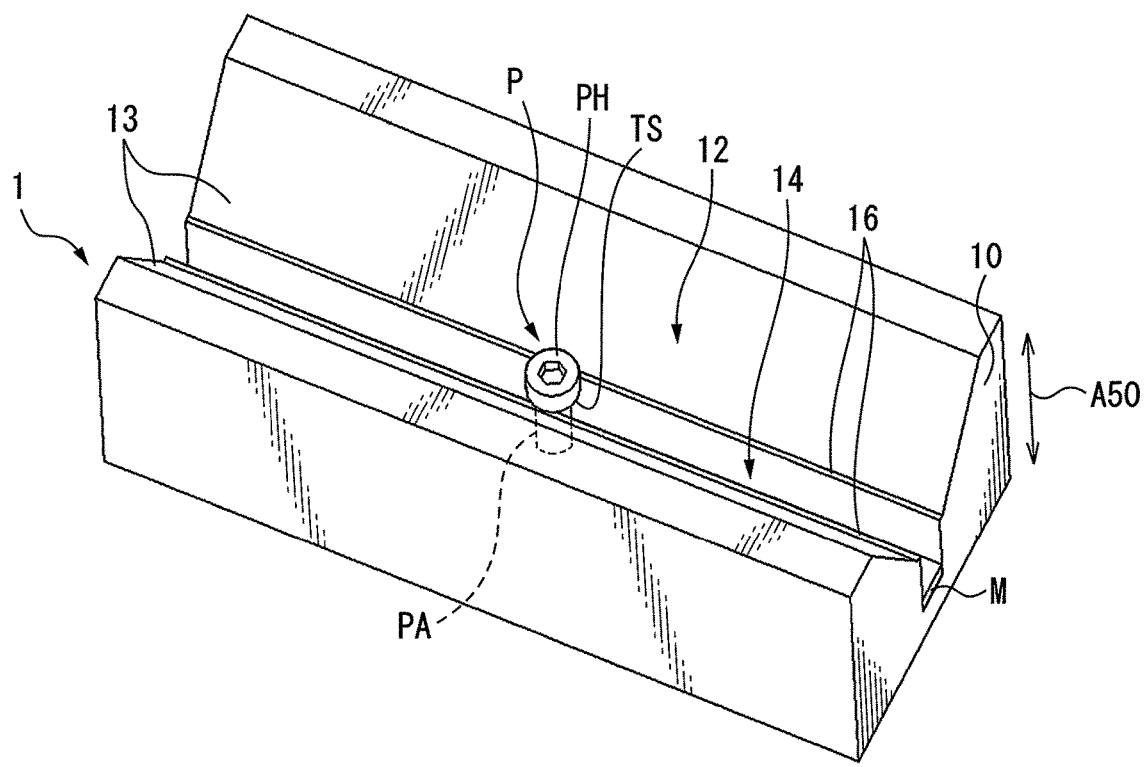
FIG. 5 is a second perspective view which shows an axis part of a part which swings inside of a groove part in the attitude adjusting jig of FIG. 2 and FIG. 3.

FIG. 5 is a second perspective view which shows the axis part PA of the part P which swings at the inside of the groove part 14 of the attitude adjusting jig 1 of FIG. 2 and FIG. 3. FIG. 5 shows the state where the slant angle of the axis part PA with respect to the up-down direction (direction of arrow A50 in figure) is generally zero. Incidentally, the magnitude of the attraction force of the magnet M is inversely proportional to the square of the distance from the magnet M, and therefore the attraction force of the magnet M which acts on the front end part of the axis part PA rapidly increases as the distance from the front end part of the axis part PA engaged in swinging motion to the magnet M becomes smaller (i.e., as the axis part PA engaged in swinging motion approaches the state of FIG. 5). Under the influence of such an effect of the attraction force of the magnet M, the swinging motion of the axis part PA attenuates and stops in a relatively short time. As a result, the part P comes to rest at an attitude with the axis part PA directed downward. Further, even after the part P comes to rest at the above attitude, a large attraction force continues to act on the front end part of the axis part PA, and therefore the part P which is placed on the attitude adjusting jig 1 can be stably retained in the attitude with the axis part PA directed downward as is.

Referring again to FIG. 2 and FIG. 3, a contact surface 16 is formed between the bottom end of each of the slanted surfaces 13, 13 of the recessed part 12 of the main body 10, and the top end of each of the pair of inside surfaces 15, 15 of the groove part 14, so as to contact the above-mentioned lower surface TS of the head part PH (see also FIG. 4 and FIG. 5). However, the bottom ends of the slanted surfaces 13, 13 may also be continuous with the respective inside surfaces 15, 15. In that case, the above contact surfaces 16, 16 are omitted. As shown in FIG. 3, the contact surfaces 16, 16 according to the present example are generally vertical with respect to the up-down direction of the main body 10, and are capable of contacting at least part of the lower surface TS of the head part PH. Therefore, when the swinging motion of the axis part PA of the part P stops, the lower surface TS of the head part PH abuts against the contact surfaces 16, 16. After this, the lower surface TS of the head part PH is supported by the contact surfaces 16, 16, and therefore the part P which is placed on the attitude adjusting jig 1 can be stably retained in an attitude with the axis part PA directed downward as is.

Referring again to FIG. 1, a conveyor device 2 in the part conveyor system S of the present embodiment will be explained. As shown in FIG. 1, the conveyor device 2 of the present example is a vertical articulated robot which comprises an arm A having a wrist part W at its front end, and a hand H attached to the wrist part W. Further, the arm A of the conveyor device 2 of the present example can freely change the position and attitude of the hand H which is attached to the wrist part W by a plurality of servo motors. FIG. 1 shows a six-axis vertical articulated robot which has six servo motors, but the number of axes of the arm A of the conveyor device 2 is not limited to this.

Further, the hand H of the conveyor device 2 of the present example is provided with a suction nozzle N having an elongated tubular form. The base end of the suction nozzle N is connected through an air tube (not shown) to a vacuum feed source such as a vacuum pump. Therefore, when the arm A brings the front end of the suction nozzle N into contact with any location of the part P, and the vacuum feed source sucks in air from the inside of the suction nozzle N in this state, the part P sticks to the front end of the suction nozzle N under the influence of the negative pressure which is formed at the inside of the suction nozzle N. In this way, the conveyor device 2 grips a part P which is placed on the start area during the loading operation, and also grips a part P which is placed on the attitude adjusting jig 1 during the takeout operation. Further, when the vacuum in the suction nozzle N which grips the part P is broken, the part P is released from the front end of the suction nozzle N. In this way, the conveyor device 2 releases the part P above the attitude adjusting jig and drops it into the recessed part 12 during the loading process, and releases and unloads the part P at the destination area during the takeout process.

Referring to FIG. 1, the part conveyor system S of the present embodiment further comprises a detection device 3 which detects the position of the part P which is placed on the attitude adjusting jig 1. The detection device 3 of the present example has a displacement meter G which can measure the distance to the measured object, and detects the position of the part P which is placed on the attitude adjusting jig 1 in cooperation with the conveyor device 2. The process by which the detection device 3 of the part conveyor system S of the present embodiment detects the position of the part P in cooperation with the conveyor device 2 will sometimes be referred to below as the "position detection process". However, the part conveyor system S of the present embodiment may also comprise a detection device 3 which operates independently from the conveyor device 2.

Figure 6:
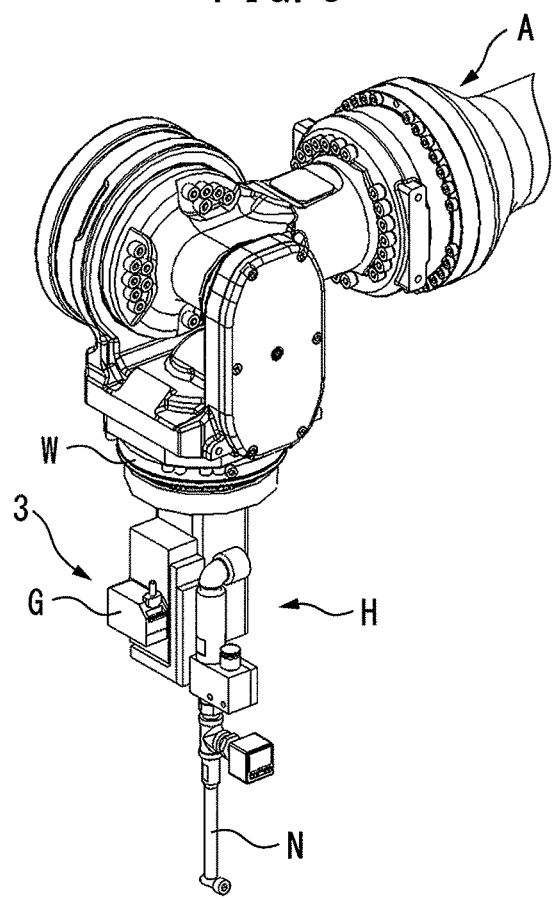
FIG. 6 is a partial enlarged view which shows the hand and its vicinity of the conveyor device in FIG. 1.

FIG. 6 is a partial enlarged view which shows the hand H and its vicinity of the conveyor device 2 in FIG. 1. The displacement meter G of the detection device 3 of the present example is an optical displacement meter such as a laser displacement meter. I.e., the displacement meter G of the present example emits light toward a measured object so as to measure the distance to the measured object. However, the type of the displacement meter G of the detection device 3 is not limited to this. Instead of an optical displacement meter G, an ultrasonic type, eddy current type, or contact type of displacement meter G may also be employed. As shown in FIG. 6, the displacement meter G of the detection device 3 of the present example is attached to a predetermined location of the hand H. However, the attachment location of the displacement meter G is not limited to the illustrated example. The results of measurement by the displacement meter G of the present example are transmitted to a data analysis part (not shown). The data analysis part of the present example is typically built into the control device of the conveyor device 2, but it may also be built into the displacement meter G itself.

Figure 7:
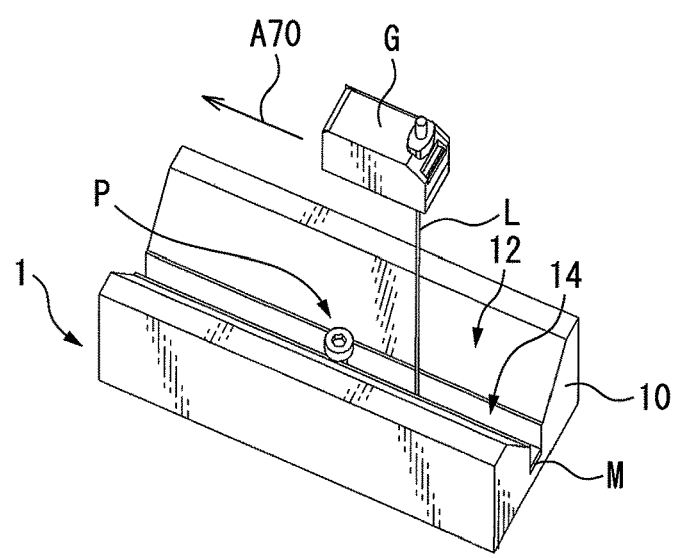
FIG. 7 is a diagram for explaining a position detection process which uses the detection device in FIG. 6.

Referring to FIG. 7, a position detection process which uses the detection device 3 of the present example will be explained. FIG. 7 is a perspective view which shows a displacement meter G and attitude adjusting jig 1 at a certain point of time in an illustrative position detection process. In FIG. 7, the conveyor device 2 (i.e., the arm A and the hand H) is omitted in order to make it easier to understand the positional relationship between the displacement meter G and the attitude adjusting jig 1. In the position detection process of the present example, first, the arm A of the conveyor device 2 positions the displacement meter G above the attitude adjusting jig 1. This ensures that the displacement meter G can emit downward light L generally parallel with the up-down direction of the main body 10 toward the groove part 14. Next, the arm A of the conveyor device 2 moves the displacement meter G along the extension direction of the groove part 14. In the meantime, the displacement meter G successively measures the distance to the measured object which is located on the path of the light L, and the above data analysis part successively compares the measurement result of the displacement meter G and a predetermined threshold value. The movement direction of the displacement meter G in this step is expressed by the arrow A70 in the figure. Further, if the measurement result of the displacement meter G becomes smaller than a predetermined threshold value, the position of the measured object at that point of time can be detected as the position of the part P which is placed on the attitude adjusting jig 1. If a detection device 3 with such a displacement meter G is employed, it is possible to inexpensively construct the part conveyor system S.

Figure 8:
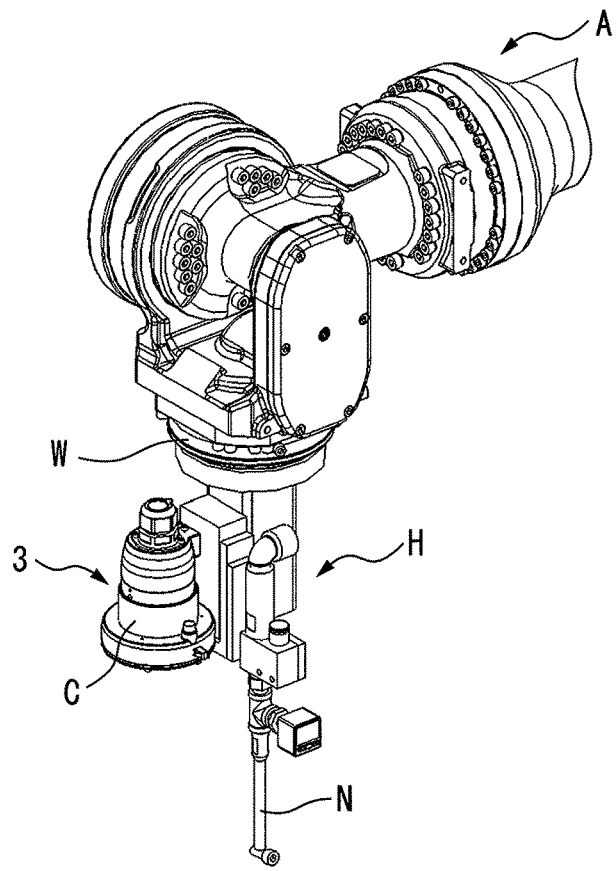
FIG. 8 is a partial enlarged view similar to FIG. 6 which shows the hand and its vicinity of the conveyor device in a part conveyor system which employs another detection device.

Here, another example of the detection device 3 in the part conveyor system S of the present embodiment will be explained. FIG. 8 is a partial enlarged view similar to FIG. 6, which shows the hand H and its vicinity of the part conveyor system S which uses the detection device 3 of the present example. The detection device 3 of the present example is a visual sensor which has a camera C and image processing unit, and detects the position of the part P which is placed on the attitude adjusting jig 1 in cooperation with the conveyor device 2. The camera C of the detection device 3 of the present example is a digital camera which is provided with an imaging device such as a CCD (Charge Coupled Device) image sensor or CMOS (Complementary Metal-Oxide Semiconductor) image sensor. As shown in FIG. 8, the camera C of the detection device 3 of the present example is attached to a predetermined location of the hand H. However, the attachment location of the camera C is not limited to the example in the figure.

Figure 9:
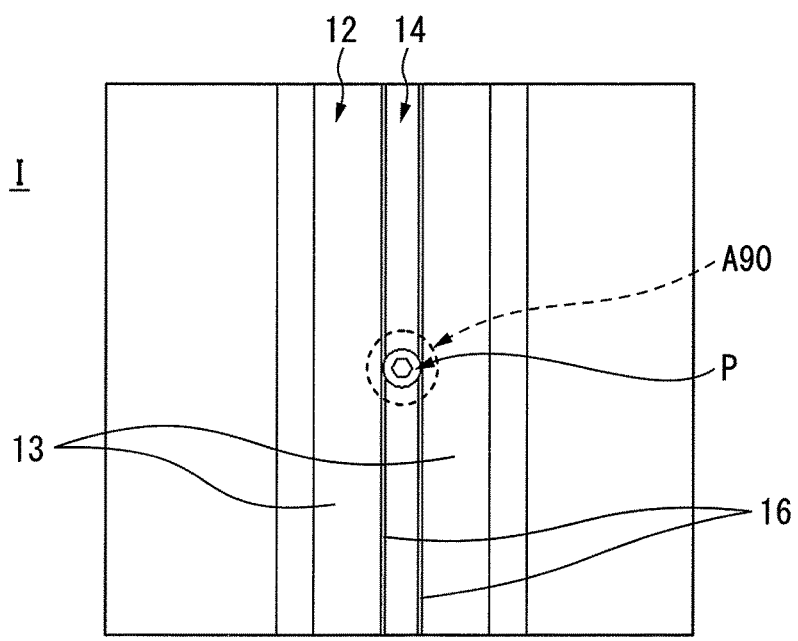
FIG. 9 is a schematic view which shows one example of a captured image which is obtained by a camera of the detection device in FIG. 8.

FIG. 9 is a schematic view which shows one example of a captured image I which is obtained by the camera C of the detection device 3 in FIG. 8. Such a captured image I is transmitted to the above image processing system. The image processing system of the present example is typically built into a control device of the conveyor device 2, but it may also be built into the camera C itself. Further, the image processing system of the present example performs pattern matching with respect to the received image I to judge if the received image I contains a pattern corresponding to the part P. The image processing system of the present example can use various patterns corresponding to various parts P to perform the above pattern matching. Referring to FIG. 9, the position detection process using the detection device 3 of the present example will be explained. In the position detection process of the present example, first, the arm A of the conveyor device 2 positions the camera C above the attitude adjusting jig 1. This ensures that the camera C can capture the groove part 14 of the attitude adjusting jig 1 from above. One example of the captured image I in this step is shown in FIG. 9.

Next, the above image processing system performs pattern matching with respect to the captured image which is received from the camera C. Further, if the captured image I contains the pattern which corresponds to the part P, the position of the captured object which is represented by the pattern can be detected as the position of the part P which is placed on the attitude adjusting jig 1. When a plurality of patterns are used in this step, it is possible to detect the type of the part P as well as the position of the part P. The position of the part P recognized by the image processing system is expressed by the arrow A90 in the figure. On the other hand, if the captured image I does not contain the pattern which corresponds to the part P, the arm A changes the position of the camera C with respect to the attitude adjusting jig 1, then the camera C again captures an image of the groove part 14 and transmits it to the image processing system. The detection device 3 of the present example can further analyze the captured image I of the camera C to detect the attitude of the part P in addition to the position and type of the part P. Further, if it is confirmed that the part P is not adjusted to the above attitude where the axis part PA is directed downward, a predetermined warning message can be notified to the user through the control device of the conveyor device 2, etc.

Figure 10:
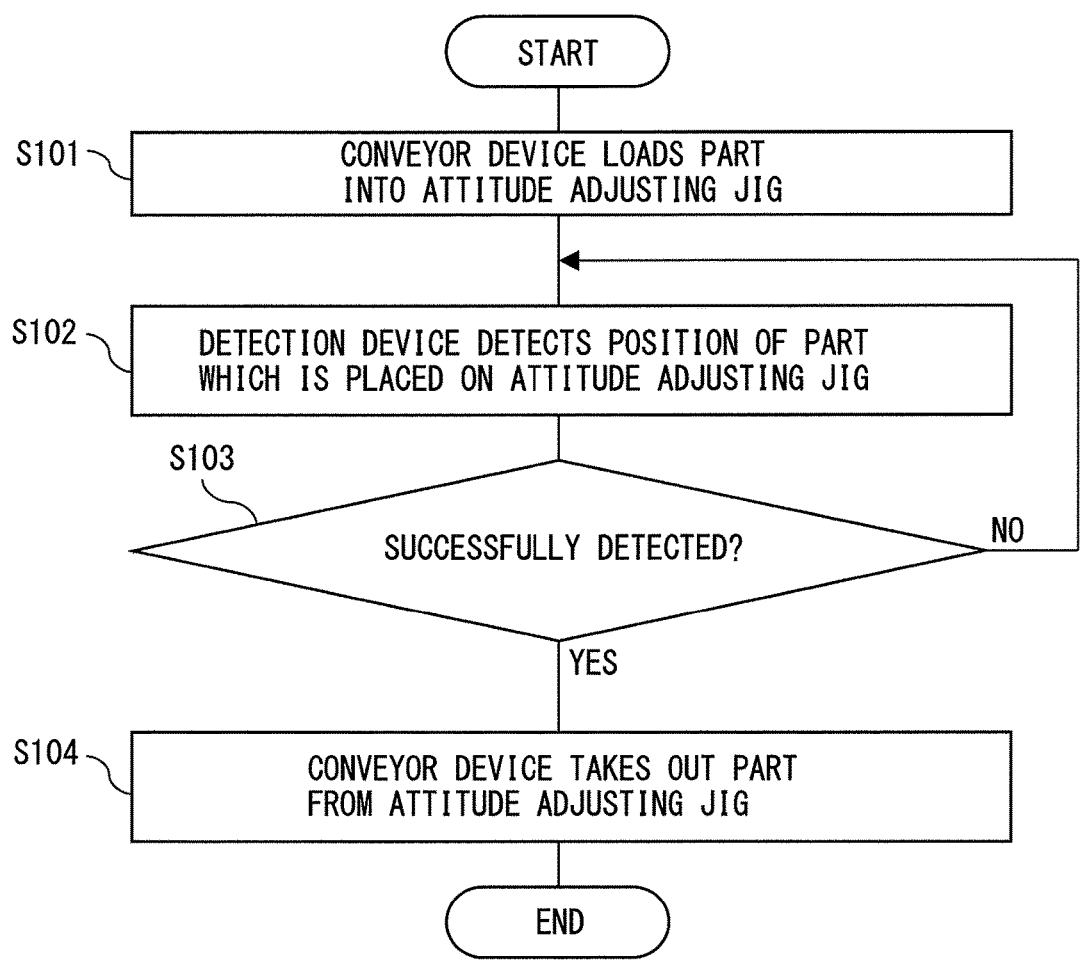
FIG. 10 is a flow chart which shows a procedure of an illustrative conveyance process according to a part conveyor system of the present embodiment.

Next, the conveyance process according to the part conveyor system S of the present embodiment will be explained. FIG. 10 is a flow chart which shows a procedure of an illustrative conveyance process. As shown in FIG. 10, first, at step S101, the conveyor device 2 loads one part P which is held by suction in the start area, into the recessed part 12 of the attitude adjusting jig 1. When the part P is loaded into the recessed part 12 of the attitude adjusting jig 1, the axis part PA of the part P enters into the groove part 14 and the lower surface TS of the head part PH abuts against the pair of contact surfaces 16, 16. This ensures that the attitude of that part P is adjusted to a predetermined attitude with the axis part PA directed downward (see FIG. 2 and FIG. 3). Next, at step S102, the detection device 3 performs the position detection process for detecting the position of the part P which is placed on the attitude adjusting jig 1. The specific procedure of the position detection process is as explained above referring to FIG. 6 to FIG. 9 etc. Further, if the detection device 3 succeeds in detecting the position of the part P (step S103, YES), the part conveyor system S proceeds to the later explained step S104.

On the other hand, if the detection device 3 fails to detect the position of the part P (step S103, NO), the conveyor device 2 suitably changes the position of the detection device 3 with respect to the attitude adjusting jig 1 (see FIG. 7, etc.), and the detection device 3 again performs the position detection process (step S102). Further, at step S104, the conveyor device 2 takes out the part P which is placed on the attitude adjusting jig 1 and conveys it to the destination area. In so doing, the conveyor device 2 positions the front end of the suction nozzle N of the hand H with respect to the part P, based on the position of the part P which is detected by the position detection process (step S102). At this point of time, the part P which is placed on the attitude adjusting jig 1 is retained at the attitude where the axis part PA is directed downward (i.e., attitude where the head part PH is directed upward) (see FIG. 2 and FIG. 3), and therefore the suction nozzle N of the hand H can reliably hold by suction the top surface of the head part PH of the part P.

In the above way, according to the part conveyor system S of the present embodiment, it is possible to adjust the attitude of a part P having an axis part PA and head part PH while conveying that part P, without using a drive means such as a motor, and therefore it is possible to simplify the structure of the system as a whole and thus possible to reduce the manufacturing cost of the system. Further, according to the part conveyor system S of the present embodiment, the swinging motion of the axis part PA which enters into the groove part 14 of the attitude adjusting jig 1 is attenuated in a short time under the influence of the attraction force of the magnet M, and therefore it is possible to shorten the idle time between the process of loading the part P into the attitude adjusting jig 1 and the process of taking out that part P from the attitude adjusting jig 1. As a result, according to the part conveyor system S of the present embodiment, it is possible to shorten the time required for the process of adjusting the attitude of a part P having an axis part PA and head part PH while conveying that part P.

Effect of Invention

According to the first and seventh aspects of the present invention, when a part having an axis part and a head part is loaded inside of a recessed part of an attitude adjusting jig, that part slides along the upward slanted surfaces and drops to the bottom of the recessed part. This ensures that the axis part of the part enters into the groove part under the influence of gravity and the attraction force of the magnet, and therefore the part is adjusted to an attitude where its axis part is directed downward. In this way, according to the first and seventh aspects, it is possible to adjust the attitude of a part having an axis part and head part while conveying the part, without using a drive means such as a motor, and thus possible to simplify the structure of the system as a whole and reduce the manufacturing cost of the system. Further, according to the first and seventh aspects, the swinging motion of the axis part which enters into the groove part of the attitude adjusting jig is attenuated in a short time under the influence of the attraction force of the magnet, and therefore it is possible to shorten the idle time between the process of loading a part into the attitude adjusting jig and the process of taking out that part from the attitude adjusting jig. As a result, according to the first and seventh aspects, it is possible to shorten the required time of a process of adjusting the attitude of a part having an axis part and head part while conveying that part.

According to the second and eighth aspects of the present invention, if the part drops along the upward slanted surfaces to the bottom of the recessed part, the axis part of that part enters into the groove part and the overhanging surface of the head part abuts against the contact surfaces, and therefore it is possible to stably retain the part in an attitude in which its axis part is directed downward.

According to a third aspect of the present invention, it is possible to automate the process of taking out and conveying a part from the attitude adjusting jig. Furthermore, according to a third aspect, it is possible to freely change the destination of the part by the above process within the work space of the robot.

According to the fourth aspect of the present invention, the conveyor device can accurately grip a part which is placed on the attitude adjusting jig by referring to the position of the part which is detected by the detection device.

According to the fifth aspect of the present invention, it is possible to inexpensively construct a part conveyor system by using a detecting device comprising a displacement meter, and also possible to confirm the type of the part which is placed on the attitude adjusting jig as well as the position of the part, by using a detection device comprising a visual sensor.

According to the sixth and ninth aspects of the present invention, it is possible to accurately adjust the attitudes of various bolts while conveying these bolts, without using a drive means such as a motor, and therefore it is possible to simplify the structure of the bolt conveyor system as a whole and thus reduce the manufacturing cost of the bolt conveyer system.

The present invention is not limited to the above-mentioned embodiment and can be modified in various ways within the scope described in the claims. For example, in the above embodiment, as the conveyor device 2, a vertical articulated robot is illustrated, but the conveyor device 2 of the part conveyor system S of the present invention can be any mechanical device which can perform the above takeout process such as a horizontal articulated robot and orthogonal robot etc. Further, the conveyor device 2 of the part conveyor system S of the present invention may also be provided with an electromagnetic attraction type hand H or servo drive type hand H instead of the suction type hand H which is illustrated in the above embodiment. Further, in the above embodiment, the conveyor device 2 grips and conveys one part P at a time, but the conveyor device 2 of the part conveyor system S of the present invention can also simultaneously grip and convey two or more parts P. Further, the dimensions, shapes, materials, etc. of the attitude adjusting jig 1 which were described in the above embodiments are only examples. Various dimensions, shapes, materials, etc. can be employed for achieving the effects of the present invention.

The invention claimed is:

1. A part conveyor system comprising:
   an attitude adjusting jig which adjusts an attitude of a part having an axis part and a head part which overhangs outward from one end of said axis part and
   a conveyor device which takes out and conveys said part from said attitude adjusting jig, wherein
   said attitude adjusting jig comprising:
   a recessed part which has an inside space which is sandwiched between a pair of upward slanted surfaces facing each other,
   a groove part which is formed at a bottom of said recessed part for holding said axis part, and
   a magnet which is arranged in said groove part.

2. The part conveyor system according to claim 1, wherein
   said attitude adjusting jig further comprises a contact surface which extends between a bottom end of each of said upward slanted surfaces and a top end of each of a pair of inside surfaces of said groove part so as to contact an overhanging surface of said head part which overhangs outward from said axis part.

3. The part conveyor system according to claim 1, wherein
   said conveyor device is a robot.

4. The part conveyor system according to claim 1, further comprising a detection device which detects a position of said part in said attitude adjusting jig.

5. The part conveyor system according to claim 4, wherein
   said detection device has a displacement meter or a visual sensor.

6. The part conveyor system according to claim 1, wherein
   said part is a bolt.

7. An attitude adjusting jig which adjusts an attitude of a part which has an axis part and a head part which overhangs outward from one end of said axis part, comprising:
   a recessed part which has an inside space which is sandwiched between a pair of upward slanted surfaces facing each other,
   a groove part which is formed at a bottom of said recessed part for holding said axis part, and
   a magnet which is arranged in said groove part.

8. The attitude adjusting jig according to claim 7, further comprising a contact surface which extends between a bottom end of each of said upward slanted surfaces and a top end of each of a pair of inside surfaces of said groove part so as to contact an overhanging surface of said head part which overhangs outward from said axis part.

9. The attitude adjusting jig according to claim 7, wherein said part is a bolt.

* * * * *